(12) United States Patent
Hatambeiki et al.

(10) Patent No.: US 11,647,368 B2
(45) Date of Patent: *May 9, 2023

(54) APPARATUS, SYSTEM AND METHOD FOR PROMOTING APPS TO SMART DEVICES

(71) Applicant: Universal Electronics Inc., Scottsdale, AZ (US)

(72) Inventors: Arsham Hatambeiki, San Diego, CA (US); Jon Gallegos, Huntington Beach, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,314

(22) Filed: Mar. 3, 2022

(65) Prior Publication Data

US 2022/0191666 A1   Jun. 16, 2022

Related U.S. Application Data

(63) Continuation of application No. 17/126,370, filed on Dec. 18, 2020, now Pat. No. 11,317,261, which is a
(Continued)

(51) Int. Cl.
 *H04W 4/60* (2018.01)
 *H04N 21/482* (2011.01)
 (Continued)

(52) U.S. Cl.
 CPC .......... *H04W 4/60* (2018.02); *H04N 21/4126* (2013.01); *H04N 21/41265* (2020.08);
 (Continued)

(58) Field of Classification Search
 CPC .......... H04W 4/60; H04N 21/4126; H04N 21/41265; H04N 21/42202; H04N 21/426;
 (Continued)

(56) References Cited

U.S. PATENT DOCUMENTS 10,735,930 B2 *  8/2020  Yuan ................ H04L 67/125
10,884,579 B2 *  1/2021  Van Os ............. G06F 3/04886
(Continued)

OTHER PUBLICATIONS

Epo, extended European search report issued on EP patent application No. 22163594.9, dated Jul. 6, 2022, 8 pages.
(Continued)

*Primary Examiner* — Alazar Tilahun
(74) *Attorney, Agent, or Firm* — Greenberg Traurig, LLP

(57) ABSTRACT

Apparatus, system and method for promoting media apps to an end user of a smart device. The smart device gathers information of apps that have been installed into the smart device and provides this information to a remote server. The remote server compares the information sent by the smart device to an identification of promoted apps received from a remote source to identify apps that are not installed in the smart device that are included in the identification of promoted apps. The remote server then notifies the smart device of which apps in the identification of promoted apps are not installed into the smart device, so that a user of the smart device may choose to have the missing app installed.

12 Claims, 6 Drawing Sheets

Related U.S. Application Data continuation of application No. 15/377,274, filed on Dec. 13, 2016, now Pat. No. 10,904,727.

(51) Int. Cl.
*H04N 21/426* (2011.01)
*H04N 21/422* (2011.01)
*H04N 21/41* (2011.01)

(52) U.S. Cl.
CPC ..... *H04N 21/426* (2013.01); *H04N 21/42202* (2013.01); *H04N 21/482* (2013.01)

(58) Field of Classification Search
CPC ..... H04N 21/482; H04L 67/025; H04L 67/04; H04L 67/12; H04L 67/34
See application file for complete search history.

(56) References Cited

U.S. PATENT DOCUMENTS

| | | |
|---|---|---|
| 2007/0118499 A1 | 5/2007 | Hwang |
| 2011/0179149 A1 | 7/2011 | Kazan et al. |
| 2011/0288932 A1 | 11/2011 | Marks et al. |
| 2014/0059603 A1 | 2/2014 | Lee et al. |
| 2014/0157387 A1* | 6/2014 | Lee .................. G06F 21/30 707/638 |
| 2014/0171116 A1* | 6/2014 | LaMarca ............ H04W 4/021 455/456.3 |
| 2014/0215457 A1* | 7/2014 | Gava .................. H04L 67/1095 709/201 |
| 2015/0310113 A1 | 10/2015 | Lingyun |
| 2015/0334165 A1 | 11/2015 | Arling et al. |
| 2016/0057179 A1 | 2/2016 | Volach |
| 2016/0299977 A1* | 10/2016 | Hreha ................ G06F 16/9537 |
| 2016/0381108 A1 | 12/2016 | Van Coppenolle et al. |
| 2017/0134933 A1 | 5/2017 | Padmanabhan et al. |

OTHER PUBLICATIONS

ISA/US, International Search Report and Written Opinion issued on PCT application No. US17/66022, dated Jan. 18, 2018, 14 pages.
EPO, extended European search report issued on European patent application No. 17880891.1, dated Jul. 6, 2020, 8 pages.

* cited by examiner

APPARATUS, SYSTEM AND METHOD FOR PROMOTING APPS TO SMART DEVICES

RELATED APPLICATION INFORMATION

This application claims the benefit of and is a continuation of U.S. application Ser. No. 17/126,370, filed on Dec. 18, 2020, which application claims the benefit of and is a continuation of U.S. application Ser. No. 15/377,274, filed on Dec. 13, 2016, which applications are incorporated herein by reference in their entirety.

BACKGROUND

Communication and entertainment devices such as cellular phones, tablet computers, e-books, hand-held games, portable media players, PDAs, etc. are known in the art as smart devices, and generally include features such as graphical user interfaces on color touch screens, Bluetooth and/or Wi-Fi capability, etc. Many such devices also incorporate support for ancillary applications (hereafter referred to as "apps") for example calendars, email, games, social media interfaces, maps, navigation and may contain remote control apps which are capable of controlling home entertainment appliances, other smart devices, etc. Furthermore, support for such apps may also be provided as a feature of certain entertainment appliances such as for example, smart TVs, cable or satellite set top boxes, etc. which require downloading the app by the end user to a smart device for installation.

Typically, the end user of an entertainment device is required to locate, via a cloud based server, and install the manufacturer's app on a controlling device such as a cell phone, tablet, PDA or computer. Some apps are capable of additional operations such as determining similar type apps which are installed in other network connected smart devices. For example, an app contained in a smart TV, may be associated with software programming capable of searching for similar installed apps which are contained within the smart TV and/or may be capable of searching for apps which are contained within a smart device, which is network connected, and which is associated with the same service set identifier.

Content providers, such as cable or satellite service providers, may wish to suggest new applications or new media content to their customers, for installation or storage on one or more customer entertainment devices, such as televisions, set-top boxes, or even mobile phones and tablet computers. However, these "multiple-system operators" or MSOs as they are called, are currently unable to determine what applications are presently installed in each of their customers' various consumer entertainment devices. Thus, it would be redundant, and possibly irritating, to suggest new apps that are already present on consumer entertainment devices.

It would be desirable for multiple-system operators, as well as other third parties, to suggest new applications to their customers without irritating their customers with redundant suggestions of apps already installed onto their entertainment devices.

SUMMARY

Embodiments described hereinafter relate generally to an apparatus, system and method for promoting apps or other media to a smart device. In one embodiment, a smart device is described for promoting new apps or other media, such as broadcasting or webcasting, to an end user of the smart device. The smart device includes at least an electronic storage medium having processor-readable code embodied therein, and an identification of promoted apps, the promoted apps being those apps that have been promoted by a remote source, a communication interface for receiving information from a remote server, a user interface for providing information to, and commands from, the end user, a processor, coupled to the electronic storage medium, the communication interface, and the user interface, for executing the processor-readable code that causes the smart device to receive, by the processor via the communication interface, the identification of promoted apps from the remote source, determine, by the processor, an identification of apps presently installed on the smart device, compare, by the processor, the identification of apps presently installed on the smart device with the identification of promoted apps, determine, by the processor, one or more missing apps from the comparison of the identification of apps presently installed on the smart device with the identification of promoted apps, the missing apps being one or more apps listed in the identification of promoted apps that are not present in the smart device, and provide a notification to the user interface indicating that one or more of the missing apps are available for installation.

In another embodiment, a server is described for promoting one or more apps to an end user of a smart device. The server includes at least an electronic storage medium having processor readable code embodied therein, a communication interface for sending and receiving information to and from the smart device over a wide-area network and remotely located at an end user location, a processor, coupled to the electronic storage medium and the communication interface, for executing the readable code that causes the server to receive, by the processor via the communication interface, an identification of apps presently installed on the smart device from the smart device, receive, by the processor via the communication interface, an identification of promoted apps from a remote source, compare, by the processor, the identification of apps received from the smart device to the identification of promoted apps received from the remote source, determine, by the processor, one or more missing apps from the comparison of the identification of apps received from the smart device to the identification of promoted apps received from the remote source, the missing apps being one or more apps listed in the identification of promoted apps that are not present in the smart device, and send, by the processor via the communication interface, a missing app notification to the end user identifying the one or more of the missing apps.

In yet another embodiment, a method for promoting apps to an end user as performed by a smart device having a processor with an associated communication interface is described. The method includes at least receiving, by the processor via the communication interface, an identification of apps presently installed on the smart device, receiving, by the processor via the communication interface, an identification of one or more promoted apps from a remote server, comparing, by the processor, the identification of apps received from the smart device with the identification of one or more promoted apps, determining, by the processor, that one or more apps from the identification of one or more promoted apps is not present in the identification of apps from the smart device, and providing a notification to a user interface of the smart device, indicating that one or more of the missing apps are available for installation.

In yet still another embodiment, a method for promoting one or more apps to an end user of a smart device as performed by a server having a processor with an associated communication interface is described. The method includes at least receiving, by the processor via the communication interface, an identification of apps presently installed on the smart device from the smart device, receiving, by the processor via the communication interface, an identification of promoted apps from a remote source, comparing, by the processor, the identification of apps received from the smart device to the identification of promoted apps received from the remote source, determining, by the processor, one or more missing apps from the comparison of the identification of apps received from the smart device to the identification of promoted apps received from the remote source, the missing apps comprising one or more apps listed in the identification of promoted apps that are not present in the smart device, and sending, by the processor via the communication interface, a missing app notification to the end user identifying the one or more of the missing apps.

In some circumstances, a missing app or missing TV channel may be automatically installed on a device.

A better understanding of the objects, advantages, features, properties and relationships of the subject systems and methods will be obtained from the following detailed description and accompanying drawings which set forth illustrative examples and which are indicative of the various ways in which the principles of the invention hereinafter claimed may be employed.

BRIEF DESCRIPTION OF THE DRAWINGS

For a better understanding of the various aspects of the described systems and methods, reference may be had to the illustrative examples shown in the attached drawings in which.

DETAILED DESCRIPTION

Embodiments hereinafter described relate generally to apparatuses, systems and methods for promoting new apps or a new telecommunication broadcast media, such as a new TV channel, to end users based on apps already installed on one or more smart devices. The term "apps," as used herein, generally refers to software applications installed on smart devices (e.g., communicatively coupled televisions, tablet computers, communicatively coupled set-top boxes, communicatively coupled DVRs, VCRs, video game terminals, etc.). In preferred embodiments, the apps are media rendering apps, such as a Netflix brand app, a Hulu brand app, a photo-display app, a media player app, a radio playing app, etc.

In other embodiments, the telecommunication broadcast media may comprise an analog or digital over the air broadcast, such as broadcast television content, or a webcast.

Figure 1:
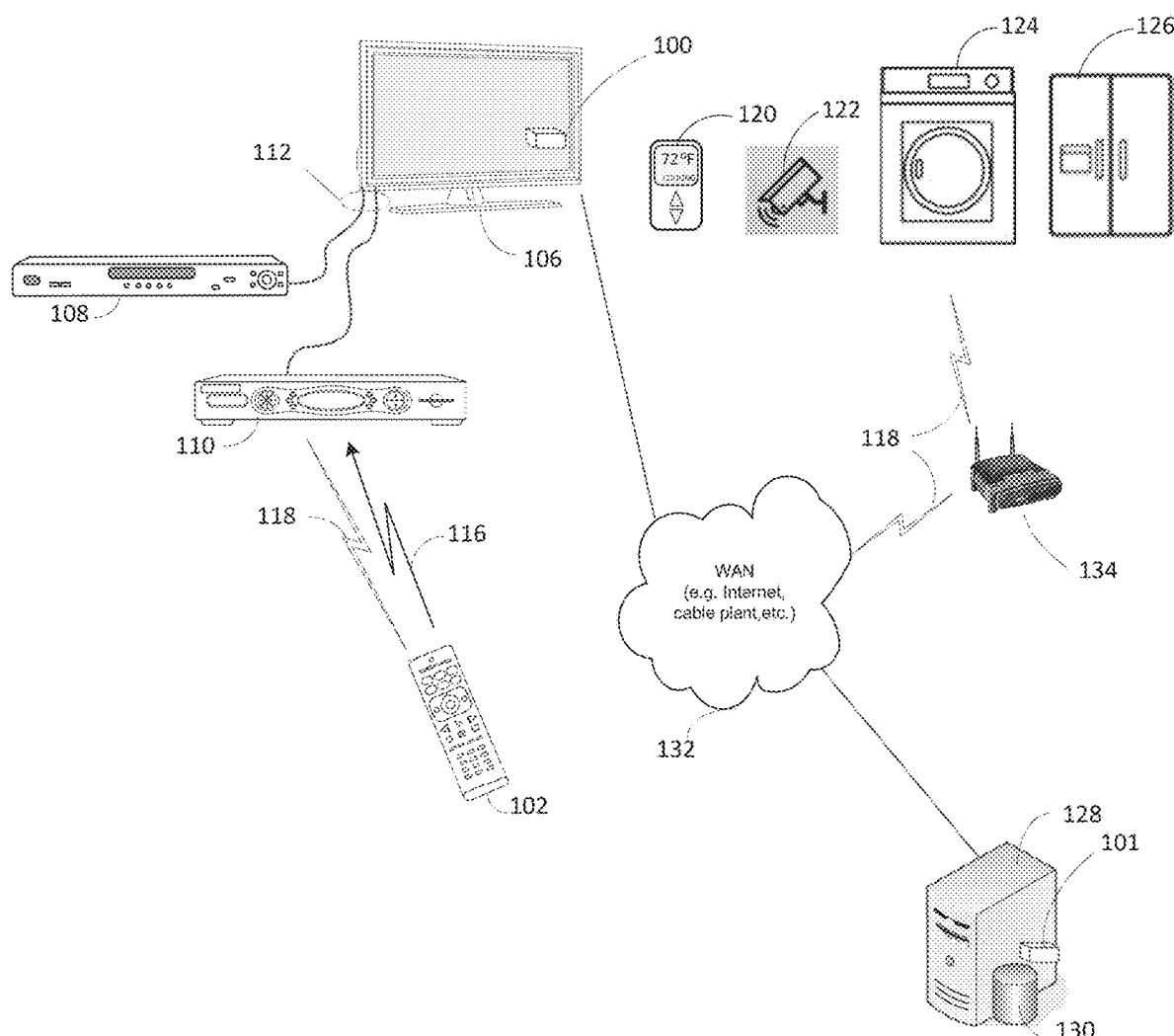
FIG. 1 is a block diagram illustrating one embodiment of a system used to promote apps to end users.

FIG. 1 illustrates one embodiment of a system in accordance with the teachings herein. As shown, FIG. 1 includes a controlling device 102, adapted to transmit different wireless command signals 118 and 116, such as Wi-Fi, BLE, RF4CE, Infra-red, etc., to one or more smart devices in an end user's home, for example a TV 106, a STB 110, a Blue-ray player 108, a smart thermostat 120, an IP-capable security system 122, a smart washer 124 and a smart refrigerator 126. While illustrated in the context of a smart TV 106, a STB 110, a Blue-ray player 108, a smart thermostat 120, an IP-capable security system 122, a smart washer 124 and a smart refrigerator 126, it is to be understood that the smart devices may include, but need not be limited to, various televisions, VCRs, DVRs, DVD players, cable or satellite converter set-top boxes ("STBs"), amplifiers, CD players, game consoles, home lighting, drapery, fans, HVAC systems, personal computers, wearable health monitoring devices, or, generally, any consumer product capable of communicating with remote devices such as smartphones and computers, and/or other smart devices, over a local-area network, a wide-area network (such as the Internet), or both.

In one embodiment, a server 128 promotes new apps to one or more smart devices located at an end-user's home. In this embodiment, one or more of the smart devices performs an app discovery operation, retrieving app information of apps already installed on other smart devices within an end user's home (typically including a list of apps installed on the smart device that performs the app discovery operation), and providing that information to the remote server 128. The server 128, in turn, analyzes the app information to determine a present configuration of apps installed on one or more smart devices located at the end-user's home. The server 128, stores the app information in a database 130 in association with the end-user and compares the app information to one or more desired apps identified by a third party, such as a multiple-system operator, content provider, app developer, etc. Third parties may identify apps that they desire to have installed onto customer smart devices for purposes such as marketing or customer convenience, among others. The desired app(s) is/are compared to the app information received from an end user smart device by the server 128 to determine "missing apps," i.e., apps that are not installed on one or more end-user smart devices. In another embodiment, missing app are determined on a comparative basis, by comparing apps installed on one smart device vs. apps stored on another smart device at the end user's home. For example, if a Netflix viewing app is installed onto a smart phone, the server 128 may determine that a television in the same household does not, but should have, the Netflix app installed. In either case, the server 128 promotes the missing app(s) to one or more of the smart devices located at the end user's home. In one embodiment, the server 128 sends a message to one or more of the smart devices over a wide-area network 132 and a local-area network 134 with an invitation for the end user to install one or more missing apps. Preferably, although not required, the message is directed to the device onto which the missing app(s) is/are to be installed. The sever 128 may then provide the missing app(s) to one or more smart devices located at the end user's home via wide-area network 132 and local-area network 134, either directly or via use of another device, for installation onto one or more target smart devices in response to a user confirming a desire to install such app.

In one embodiment, a server 128 promotes new telecommunication broadcast media, hereafter referred to as "media", such as a TV channel, streaming live or stored content,(i.e. video or audio content), webcast, etc., to one or more smart devices located at an end-user's home. In this embodiment, one or more of the smart devices performs a media discovery operation, retrieving media information of media already installed on other smart devices within an end user's home (typically including a list of media installed on the smart device that performs the media discovery operation), and providing that information to the remote server 128. The server 128, in turn, analyzes the media information to determine a present configuration of media installed on one or more smart devices located at the end-user's home. The server 128, stores the media information in a database 130 in association with the end-user and compares the media information to one or more desired media identified by a third party, such as a multiple-system operator, content provider, app developer, etc. Third parties may identify the media that they desire to have installed onto customer smart devices for purposes such as marketing or customer convenience, among others. The desired media is/are compared to the media and media information received from an end user smart device by the server 128 to determine "missing media" i.e., TV channel(s) that are not installed on one or more end-user smart devices. In another embodiment, missing media is determined on a comparative basis, by comparing media installed on one smart device vs. media stored on another smart device at the end user's home. For example, if a TV channel is installed onto a smart phone, the system may determine that a television in the same household does not, but should have, the TV channel installed. Likewise, if a channel used to access media from a media provider is determined to be installed on a STB, a smart TV or the like (whether determined as a result of the user successfully tuning to that channel or by more general polling), the system may determine that an app used to access media from that broadcast provider should be installed, updated, or otherwise configured on another smart device to thereby allow use of the another smart device to access media from that same media provider. Similarly, if an app used to access media from a media provider is determined to be installed on a smart device, the system may determine that a channel used to access media from that broadcast provider should be installed on other smart device, such as a STB or smart TV, (or the media access capabilities of the another smart device should otherwise be updated and/or configured) to thereby allow use of the another smart device to access media from that same media provider. In any case, the server 128 may be used to promote the missing media to one or more of the smart devices located at the end user's home. In one embodiment, the server 128 sends a message to one or more of the smart devices over a wide-area network 132 and a local-area network 134 with an invitation for the end user to install one or more missing media. Preferably, although not required, the message is directed to the device onto which the missing media is to be installed. The sever 128 may then provide the missing media to one or more smart devices located at the end user's home via wide-area network 132 and local-area network 134, either directly or via use of another device, for installation onto one or more target smart devices in response to a user confirming a desire to install such media.

In another embodiment, one or more smart devices located at an end-user's home promotes new apps to itself and/or other smart devices located at the end user's home, either based on a comparative inventory of apps installed on one or more smart devices, or based on desired apps provided by a third party, via use of the server 128. In this embodiment, one or more of the smart devices performs the app discovery operation, as in the previous embodiment, and stores a listing of the apps presently installed on one or more of the smart devices (typically including a listing of its own apps). However, the stored app information is not provided to the server 128 for purposes of determining missing apps. Rather, the server 128 provides a listing of desired apps to the one or more smart devices, and the one or more smart devices compares the apps content installed in the one or more smart devices to the listing of desired apps from server 128 to determine missing apps. One or more smart devices may then promote the missing apps to itself and/or one or more of the remaining smart devices located at the end-user's home. In one embodiment, a smart device displays a message to the end user, asking the end user to install one or more missing apps. In another embodiment, a smart device sends an invitation to another smart device located at the end user's home, for the other smart device to display the invitation. In other embodiments, if an app is not installed on one or more smart devices, one or more smart devices sends a message to the server 128, requesting that the server 128 provide the missing app(s). In another embodiment, one or more smart devices automatically download the missing app(s) from a server coupled to the wide-area network 132.

In any of the embodiments, the functionality for gathering the app and/or media information from smart devices located at an end-user's home may be performed by a Universal Control Engine (UCE) coupled to a data logic manager (DM), as described in U.S. Pat. No. 9,215,394 which patent is incorporated herein by reference in its entirety. The DM comprises a modular hardware and software solution which is adapted to perform, in one embodiment, data management operations such as creating data hierarchy structures and/or statistical analysis of the raw data and may comprise a communication interface for sending and receiving information to and from one or more other smart devices, via use of the local-area network 134, and for sending and receiving information to the remote server 128, via use of the wide-area network 132. In one embodiment, when a smart device comprising a UCE/DM combination is initially powered on, an automatic provisioning process may be initiated for detecting smart devices on the same local network as the smart device containing the UCE/DM combination. Alternatively, the provisioning process may be initiated by a key press on the controlling device 102 or via a voice command recognized and acted on by the smart device containing the UCE/DM. The provisioning process is described in U.S. Pat. No. 9,307,178 which is also incorporated herein by reference in its entirety.

The provisioning process comprises sending signals to the discovered smart devices that causes the other devices to provide device information, such as EDID, CEC, vendor name, Infoframe, SSDP, MDNC, IP mDNS Service List, supported RF protocols such as BLE, ZigBee, RF4CE, Wi-Fi, etc., to the requesting smart device. Such device discovery has been used in the past to provision controlling device capability information to the controlling device 102, but is now used as a basis to gather installed app information for the purpose of suggesting new apps to users of the smart devices. The information retrieved during the provisioning process may be referred to herein as "discovered connected device information." Further details of such device detection may be found in U.S. Pat. Nos. 8,812,629, 8,558,676, 8,659,400, 8,830,074, 8,896,413, 9,215,394, 9,437,105, 9,449,500 and 9,019,435 all of which are incorporated herein by reference in their entirety.

After the provisioning operation has been completed, a smart device may initiate the app discovery operation to obtain information about apps that may be installed on one or more smart devices found during the provisioning process. The app discover operation may comprise at least an application discovery technique which crawls one or more apps to extract information related to the apps. For example, an app discovery or crawl operation may be performed by a UCE to detect any apps that may reside on each of the smart devices and smart appliances in the system. Such an app discovery operation is described by U.S. Pat. No. 8,990,183 which is incorporated herein by reference in its entirety.

In one embodiment, the app discovery operation may use a proprietary network or service discovery protocol, such as Advanced Device Discovery Protocol (ADDP) or a multitude of network protocols such as Simple Service Discovery Protocol (SSDP), Service Discovery Protocol (SDP), Bluetooth Service Discovery Protocol, or the like as needed for the particular discovery operation and may determine information, from one or more installed apps, such as an app developer identification, a hardware platform identification, (e.g., a Roku brand media device, an Apple TV brand media device, an Amazon Fire brand media device, etc.), an app name, an app version, an app developer, a website address associated with an app, an app category, an app objective (e.g., to share photos, discover new music, etc.), a target audience (e.g., avid readers, awesome parents, etc.), app hours viewed, etc., hereafter referred to as "discovered app information." The discovered app information may comprise one or more parameters or characteristics which may differ from app to app. The entirety of the discovered app information associated with each smart device may be stored locally in a memory contained in a smart device, may be stored in the database 130, via the server 128, and/or in a cloud server provisioned by a multiple-system operator, (referred to hereafter as an "MSO"), such as a DirecTV brand provider, Comcast Xfinity brand provider, etc., or in a cloud server provisioned by an original equipment operator, hereafter referred to as an "OEM", such as a Sony brand equipment operator, a Samsung brand equipment operator, etc., via use of Internet 132.

In one embodiment, the discovered connected device information and/or the discovered app information is used by a smart device to determine apps that are missing from one or more of the discovered smart devices on the local network. In another embodiment, the discovered connected device information and/or discovered app information is provided to the server 128 to perform this function.

The smart device that performed the provisioning and app discovery operation may provide some or all of the discovered connected device information and/or discovered app data to other smart devices or smart appliances. The app discovery operation may be initiated automatically by a smart device at one or more predetermined time intervals, or upon a predefined event, such as when a user wakes a smart device from standby mode or an "off" state. In other examples, the operation may be initiated manually by a user, via use of the controlling device 102, or the operation may be automatically initiated by a smart device when a new smart device connection is detected by another smart device. The entirety of extracted smart device information may be associated with the discovered app information for each smart device in the system.

A smart device may additionally perform an operation which associates one or more smart devices' discovered connected device information with its discovered app information. A smart device may additionally perform another operation which associates the discovered connected device information and/or discovered app information with an end user profile typically stored in the database 130.

The end user profile comprises information relating to a customer of an OEM, MSO, or other service provider, stored in an account of each customer in the database 130. Database 130 may store thousands, or even millions, of MSO or OEM end user accounts, with at least some of these accounts comprising end user profiles of MSO or OEM customers. Each end user profile may comprise things such as an account number, a customer name, a customer address, a customer phone number, a customer email address, an IP address, digital identity, login information, gender, preferences, web cookies, and/or other personal data of one or more persons associated with the customer.

The discovered connected device information and/or discovered app information relating to each customer may be provided to the server 128 by a smart device for inclusion in an associated end user profile or otherwise associated with each respective customer for the purpose of promoting new apps to an end user by an OEM, MSO or other third party.

The discovered app information and the discovered connected device information, hereafter referred to as "the entirety of the discovered data", may be used by the server 128 or a smart device to determine apps that are not present in one or more smart devices in each end user's home so that such missing apps may be provided or promoted to the customer. Similarly, existing apps may be updated by comparing version numbers of existing apps to the most up-to-date versions. In another embodiment, the entirety of the discovered data may be used to determine missing apps from one smart device in a user's home as compared to one or more other smart devices in the user's home. For example, the server 128 may determine that a Netflix brand app is installed in a user's smart phone but not on the user's smart TV.

Furthermore, any of the smart devices shown in FIG. 1 may operate in a cooperative operation such as any smart device acting as a client and the server 128 acting as a slave or vice versa, for the purpose of promoting a new app to an end user.

Figure 2:
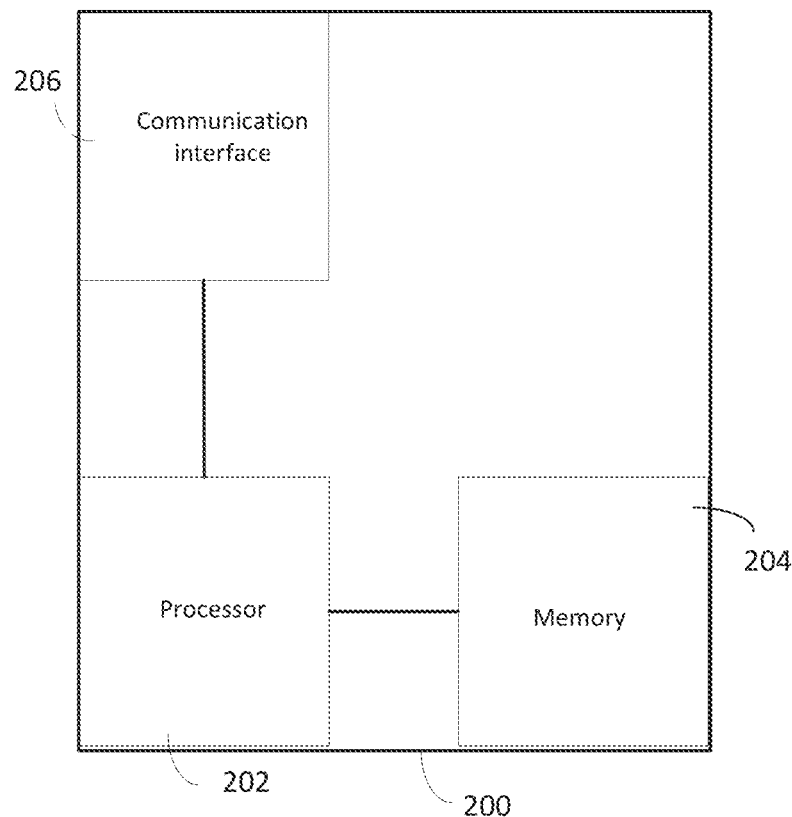
FIG. 2 is a functional block diagram of one embodiment of the remote server shown in FIG. 1, used to promote apps to end users.

FIG. 2 is a block diagram of one embodiment of the server 128 for promoting a new app to an end user.

FIG. 2 shows a processor 202, a memory 204, and a communication interface 206. It should be understood that not all of the functional blocks shown in FIG. 2 are required for operation of the server 128, that the functional blocks may be coupled to one another in a variety of ways other than that which is shown in FIG. 2 and that not all functional blocks necessary for operation of server 128 are shown, such as a power supply, a display, an input means, etc., for purposes of clarity.

The processor 202 may be configured to provide general operation of the server 128 by executing processor-executable instructions stored in the memory 204, for example, executable code. The processor 202 typically comprises a general purpose microprocessor, such as an Intel Core I7 brand or an AMD K10 brand microprocessor, although any one of a variety of microprocessors, microcomputers and or microcontrollers may be used alternatively, chosen based on factors such as computing power, cost, size, etc.

The memory 204 comprises one or more information storage devices such as ROM, RAM, Flash, other type of electronic, optical or mechanical memory device, or any combination thereof. The memory 204 may be used to store processor-executable instructions for operation of the server 128. It will also be appreciated that some or all of the illustrated memory may be physically incorporated within the same IC chip as processor 202.

As will be understood by those skilled in the art, some or all of the the memory 204 may store instructions that are intended to be executed by the processor 202 to control the operation of the server 128 to communicate with one or more smart devices located at customers' homes, as well as data which serves to define the necessary control protocols and command values for use in transmitting command and control signals to smart devices over a wide-area network. Further, the memory 204 may store end user account information associated with OEM and/or MSO end user accounts, including one or more end user profiles for each of the accounts.

The communication interface 206 comprises one or more network interfaces such as Ethernet, Wi-Fi, RF4CE or Bluetooth wireless interface(s), a USB interface, etc., that allows digital communication between the server 128 and smart devices located at customers' homes over the Wide-area network 132.

Figure 3:
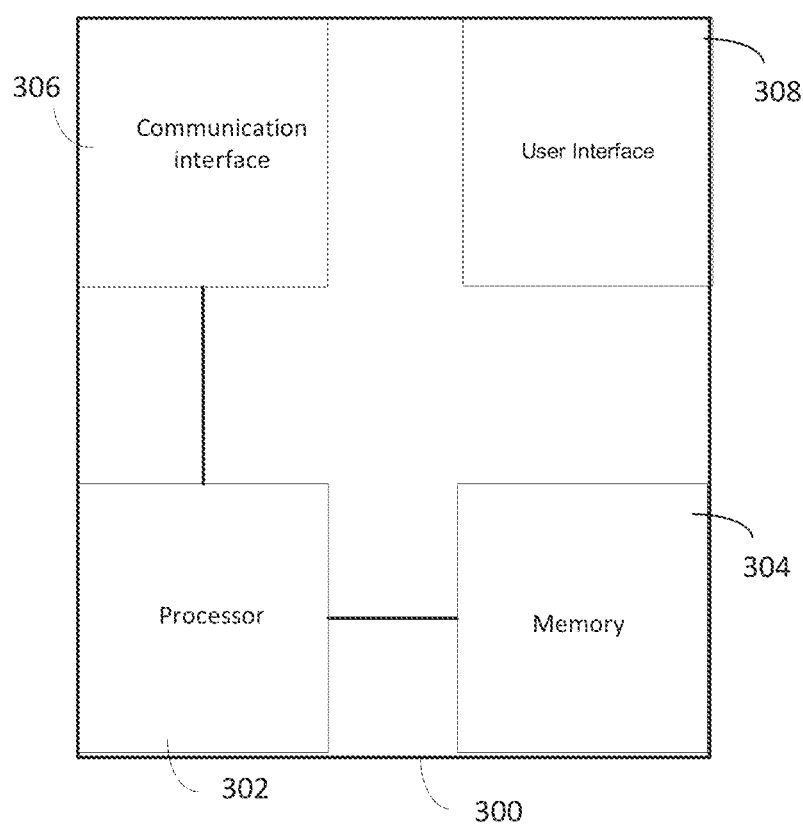
FIG. 3 is a functional block diagram of one embodiment of a smart device as shown in FIG. 1, used to promote apps to end users.

FIG. 3 illustrates a functional block diagram 300 of one embodiment of a smart device, such as the TV 106. The smart device, in this embodiment, comprises a processor 302, a memory 304, a communication interface 306 and a user interface 308. It should be understood that not all of the functional blocks shown in FIG. 3 are required for operation of mart device 300, that the functional blocks may be coupled to one another in a variety of ways other that that which is shown in FIG. 3 and that not all functional blocks necessary for operation of smart device 300 are shown, such as a power supply, a display, an input means, etc., for purposes of clarity.

The processor 302 may be configured to provide general operation of the smart device by executing processor-executable instructions stored in the memory 304, for example, executable code. The processor 302 typically comprises a general purpose microprocessor, such as an Intel Core I7 brand or an AMD K10 brand microprocessor, although any one of a variety of microprocessors, microcomputers and or microcontrollers may be used alternatively, chosen based on factors such as computing power, cost, size, etc.

The memory 304 comprises one or more information storage devices such as ROM, RAM, Flash, other type of electronic, optical or mechanical memory device, or any combination thereof. Memory 304 may be used to store processor-executable instructions for operation of the smart device. It will also be appreciated that some or all of the illustrated memory may be physically incorporated within the same IC chip as processor means 302.

As will be understood by those skilled in the art, some or all of the memory 304 may store instructions that are particular to each type of smart device. For example, if the smart device is the TV 106, the instructions may cause the TV 106 to receive television programming via the communication interface 306 and display one of the television programs on a display, in accordance with commands received from the controlling device 102. Other instructions cause the smart device to perform the smart device detection process and the app crawling operation which causes the smart device to gather the discovered connected device information and the discovered app information, respectively. Still other instructions cause the smart device to communicate with the server 128 over the wide-area network 132 and, in some embodiments, compare the discovered app information to desired apps from the server 128, and/or among different smart devices found on the common, local-area network 134.

The communication interface 306 comprises one or more data interface circuitry, such as well-known Ethernet, Wi-Fi, RF4CE, Bluetooth, or USB circuitry, that allows digital communication between the smart device and other smart devices, as well as between the smart device and the server 128 via the wide-area network 132.

The user interface 308 comprises a user input device and/or a user output device, for allowing a user to control operation of the smart device. The user input typically comprises one or more pushbuttons, keys, a touchscreen display, etc. for allowing a user to enter commands or information into the smart device. The user output device typically comprises a display screen, a touchscreen display, lights, amplified speakers, etc. for presenting media content to a user as desired/needed.

Figure 4:
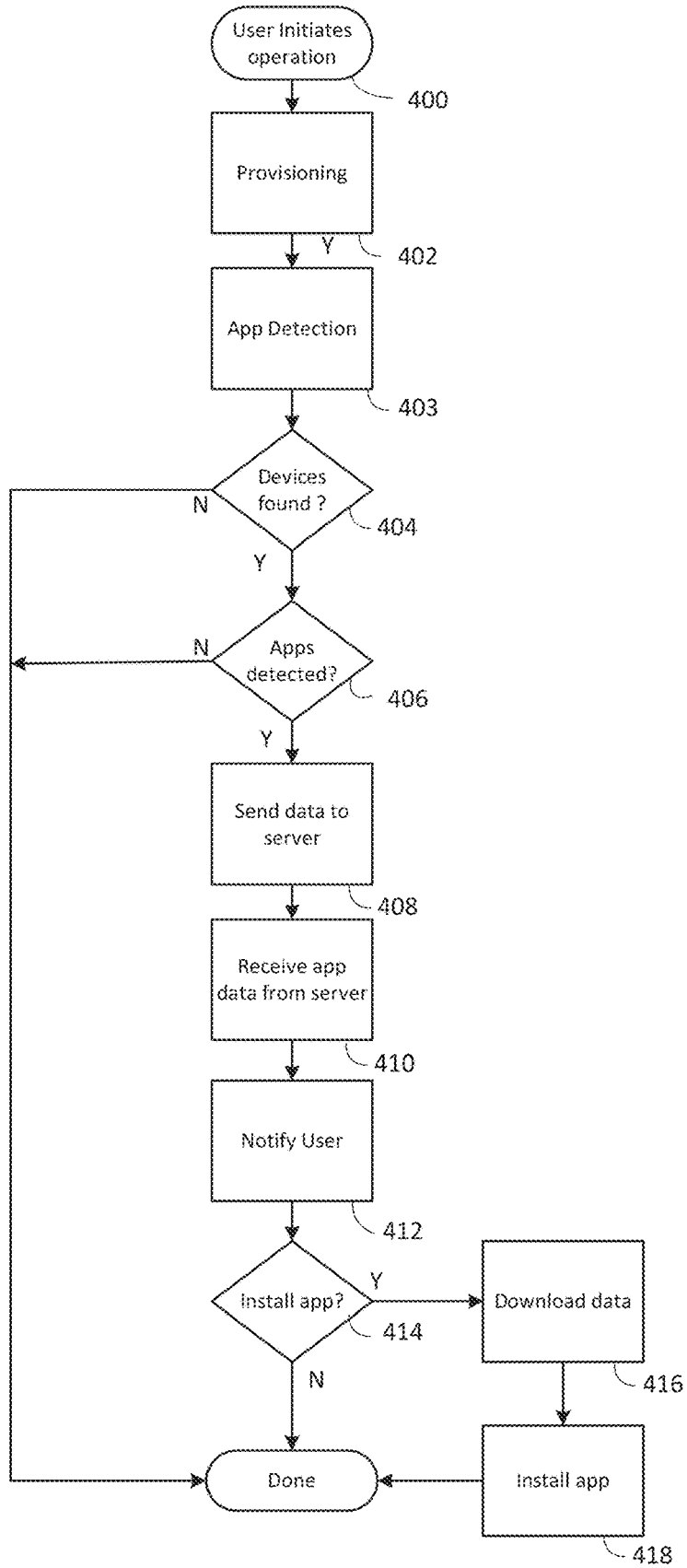
FIG. 4 is a flow diagram illustrating one embodiment for promoting apps as performed by the smart device shown in FIGS. 1 and 3.

FIG. 4 is a flow diagram illustrating one embodiment of a method for promoting media content to an end user of a smart device, performed by a smart device on a local-area network, such as the local-area network 134 in a cooperative operation with the server 128. The method is implemented by a processor, such as processor 302 shown in FIG. 3, located within a smart device, executing processor-executable instructions stored in memory 304 as shown in FIG. 3. It should be understood that in some embodiments, not all of the steps shown in FIG. 3 are performed and that the order in which the steps are carried out may be different in other embodiments. It should be further understood that some minor method steps, which would be known to those of ordinary skill in the art, have been omitted for purposes of clarity.

At step 400, a user of a smart device may initiate a provisioning operation, for example when a user of the smart device initially powers on the smart device, via a key press on the controlling device 102 or via a voice command recognized and acted on by the controlling device 102. For example, the smart device may be adapted to receive commands from the controlling device 102, which may comprise a conventional universal remote control or a remote control type app resident on a smart device, such as a phone or tablet, etc., using any convenient protocol and command structure (IR, RF4CE, BLE, proprietary RF, etc.). Initiating a provisioning operation comprises the processor 302 executing the readable code that causes the smart device to initiate a connected device detection operation.

At step 402, the smart device performs the connected device detection operation to detect the presence of other smart devices and/or smart appliances located at an end customer location, i.e., at a location where the smart device is located and/or on a same local area network as the smart device. The operation may be performed automatically, such as at predetermined times or upon the occurrence of one or more predetermined events, or it may be initiated manually, such as by a user causing the remote control 102 to send a wireless signal to the smart device to perform the operation. The operation comprises the processor 302 sending commands via the communication interface 306 and the local-area network 134 to any other detected smart devices on the same local network, for the other smart devices to provide each smart device's device information, such as EDID, CEC, vendor name, Infoframe, SSDP, MDNC, supported RF protocols such as BLE, ZigBee, RF4CE, Wi-Fi, etc., to the requesting smart device. This information may be referred to herein as "discovered connected device information," and is typically stored by the processor 302 in the memory 304.

At step 403, the processor 302 performs an app detection operation, either automatically at one or more predetermined times or upon the occurrence of one or more events (for example, upon receiving the discovered connected device information in step 402), or manually, for example in response to receiving a command from the remote control 102. In one embodiment, the app detection operation is automatically triggered with the device detection operation in step 402. The app detection operation identifies apps presently installed on other smart devices that were detected in step 402. Each smart device having an app installed therein provides information related to the installed app, such as app developer identification, a hardware platform identification, (e.g., a Roku brand media player, Apple TV brand media player, Amazon Fire brand media player, etc.), an app name, a version number, an app category, an app objective (e.g., to share photos, discover new music, etc.), a target audience (e.g., avid readers, awesome parents, etc.), a user profile which may include app authentication data, etc. This discovered app information may comprise one or more parameters or characteristics which may differ from app to app and from device to device. For example, the TV 106 may determine that STB 110 contains installed apps such as an ABC network brand app, a Discovery Channel brand app, a Hulu brand app, a Pandora brand app, a DirecTV brand user profile and viewing history, etc., and determine that TV 106 contains a Hulu brand and a Pandora brand app. The DirecTV brand user profile comprises the user's on-line service account information associated with a particular media service, such as the DirecTV brand service provider in this case, account log-in information, authentication data and end user identity information. The user identity information may include but is not limited to, on-line account data and/or account log-in authentication, associated cloud based authentication data, name, location address, IP address, digital identity, login information, gender, telephone number, preferences, web cookies, personal data located in a smart device, etc., which may reside in a multitude of locations.

At step 404, when the device detection operation identifies no new devices, the operation is complete and the smart device resumes normal operations. When a new device is detected, the app detection operation discussed above may be automatically initiated by the processor 300 for the purpose of detecting installed apps for each of the discovered devices.

At step 406, when no new apps are discovered from the app detection operation in step 403, the method ends, and the smart device resumes normal operations. If one or more apps are discovered, the processor 302 may store the information related to the discovered apps in the memory 304, in one embodiment, in association with each smart device that each app is installed and/or the information may be provisioned to the server 128.

At step 408, the processor 302 may transmit some or all of the entirety of the discovered data to the server 128, via use of the communication interface 306 and the wide-area network 132, or the data may be transmitted to another communicatively coupled smart device for causing the smart device to perform a local storage operation. For example, the entirety of the discovered data may be stored locally, in the memory of a connected smart device or a smart appliance, may be stored via a third party on an online server, or may be stored at server 128.

At step 410, in one embodiment, the processor 302 receives a message from the server 128 comprising a notification of one or more apps that are present in at least one smart device, but not present in other smart devices (herein "missing apps"). In another embodiment, the message comprises a notification of one or more apps present on one device type (such as a set-top box, television, tablet computer, mobile phone, etc.) but missing from other similar device types. In yet another embodiment, the message from the server 128 comprises an identification that a new version of one or more apps on one or more smart devices is available. In any of these embodiments, the server 128 compares the apps that are installed on each smart device for each end user (i.e., all of the smart devices discovered in step 400) and determines apps that are missing from one smart device as compared to one or more other smart devices, based on device type, and/or based on version numbers. The server 128 then generates and sends the message to the smart device that provided the entirety of the discovered data via the wide-area network 132.

In another embodiment, either in addition or alternative to the embodiment described above, the server 128 receives an indication of desired apps from an OEM, MSO or other party, the list of desired apps comprising, in one embodiment, a listing of apps that should, as believed by management of the OEM, MSO or other party, be installed onto various smart devices in general. In another embodiment, the list of desired apps comprises a listing of apps on a device type-by-device type bases, or even on a manufacturer-by-manufacturer, and/or on a model-by-model basis. For example, the list of desired apps may comprise a listing of desired apps for any type of mobile tablet, a listing of desired apps for any type of mobile phone, and/or a listing of desired apps for particular makes and models of televisions. In this embodiment, server 128 compares the indication of desired apps to the some or all of the discovered app data to determine which apps in the indication are missing from one or more of the smart devices listing in the entirety of the discovered app data. As a result of this comparison, the server 128 generates and sends to the processor 302, via the wide-area network 132, the message comprising a notification of one or more of the desired apps that are not present in at least one of the smart devices.

In either embodiment, the missing apps themselves are preferably provided in the message to the processor 302 via the wide-area network 132, either alternative or in addition to the indication of the missing apps.

At step 412, in one embodiment, in response to receiving the message sent by the server 128 in step 410, the processor 302 causes a notification to be presented to a user of the smart device associated with the processor 302 via the user interface 308, querying a user of the smart device whether the user would like to install the apps listed in the message from the server 128. The notification may, alternatively or in addition, be displayed to other smart devices on the same local-area network as the smart device that received the message from the server 128. In one embodiment, the processor 302 generates customized notifications for one or more other smart devices, each customized notification comprising a listing of apps identified in the message sent from the server 128 that are relevant to each smart device type, make and/or model, as identified in the message from the server 128. For example, if the smart device comprising the processor 302 is a television, and another smart device on the same local-area network is an Apple iPad brand device, and the message comprises an identification of a Hulu brand app for an Apple iPad brand device and a Netflix brand app for any make of television, the processor 302 may generate and cause a notification to be displayed on the user interface 308, querying a user whether or not to install the Netflix brand app, and also generate and send a second notification to the iPad brand device, querying a user whether or not to install the Hulu brand app.

In one embodiment, the notification may comprise an activable icon or text for display via the user interface 308, for user activation. Such instructions to a user may be indicated via use of an icon, which may be displayed as activable text, such as "Watch Now," "Install," or "Play" which, when activated by the user, cause the app and/or media content to be installed and/or downloaded. Examples of such operations are described in U.S. Pat. Nos. 7,782,309, 8,473,865 and 6,917,302 which incorporated herein by reference in their entirety.

Additionally, the activable icons may include a macro operation such as "Install All" which, when activated, performs the operations described in steps 414 et seq.

In one embodiment, the processor 302 may generate an icon, text message, voice message, email, or some other notification, for transmission to a mobile device associated with the user. The processor 302 may obtain contact information of the user by providing an inquiry to the server 128, where the user's phone number or email address may be stored in association with a user account, and transmit the text message, voice message, email, or other notification directly to the user.

In another embodiment, the processor 302 sends a command to the server 128 for the server 128 to generate such a text message, voice message, email or other notification and provide such a message to the user, using contact information stored in the database 130.

In yet another embodiment, the apps listed in the message from the server 128 and associated with the type, make and/or model of the smart device are automatically installed on each of the smart devices, without notifying the user.

At step 414, a user responds to the notification generated by the processor 302 using the user interface 308, which provides a user response to the processor 302 of whether the user wants to install, store, activate, download, or otherwise accept the app(s) displayed by the user interface 308. The response may comprise an identification of the apps selected by the user, in the case where two or more missing apps are missing from the smart device.

At step 416, in response to receiving the user response in step 414, in one embodiment, the processor 302 generates and transmits a command via the communication interface 306 to obtain the identified app(s) from the server 128 or otherwise cause the identified app(s) to be downloaded from another server over the wide-area network 132. The identified app(s) are received by the processor 302 over the wide-area network 132 and the communication interface 306 where they are stored in the memory 304.

At step 418, the processor 302 installs the received app(s) from step 414, and after installation, the processor 302 may generate and display a message to the user that the app(s) have been successfully installed.

Figure 5:
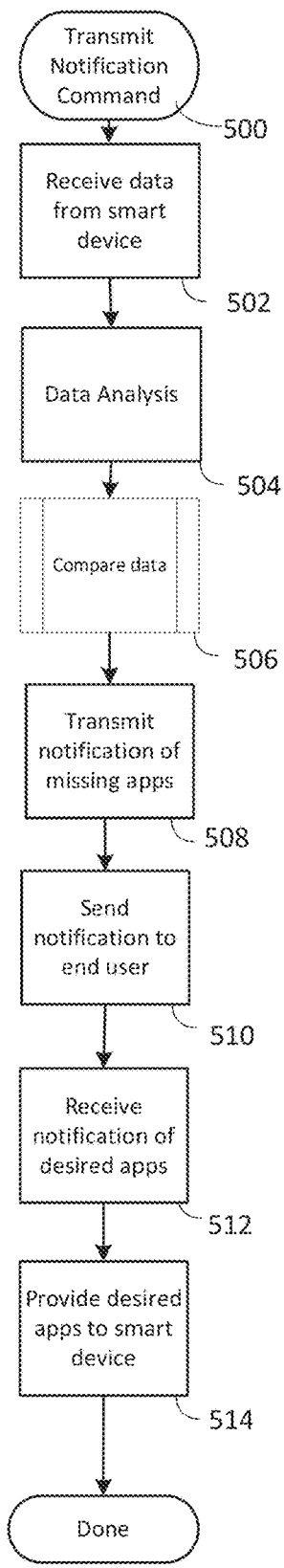
FIG. 5 is a flow diagram illustrating one embodiment for promoting apps content as performed by the remote server shown in FIGS. 1 and 2.

FIG. 5 is a flow diagram illustrating one embodiment of a method for promoting apps to an end user of a smart device, performed by the server 128 in a cooperative operation with a smart device, such as the TV 106. The method is implemented by a processor, such as the processor 202 shown in FIG. 2, located within the server 128, executing processor-executable instructions stored in the memory 204 as shown in FIG. 2. It should be understood that in some embodiments, not all of the steps shown in FIG. 5 are performed and that the order in which the steps are carried out may be different in other embodiments. It should be further understood that some minor method steps, which would be recognized by those of ordinary skill in the art, have been omitted for purposes of clarity.

At step 500, the processor 202 may transmit a notification to the processor 302, via use of the communication interface 206, indicating that the server 128 is ready to receive information comprising some or all of the discovered data stored by a smart device at an end user's home. In one embodiment, the notification may also comprise data characteristic information on a device-by-device basis, such as a fingerprint or signature, to identify a data format, header, payload, packet size, etc. In another embodiment, the processor 202 transmits a command to one or more smart devices at the end user's home to provide the entirety of the discovered data.

At step 502, the processor 202 receives at least some of the entirety of the discovered data from one or more smart devices located at the end user's home. At least some of the entirety of the discovered data is provided by the processor 302, in response to receiving the notification/command from processor 202. In one embodiment, the processor 302 may transmit the data as raw format and as a data dump. In another embodiment the data is transmitted via use of a multitude of protocols, such as TCP/IP or other protocol, as needed for the operation.

At step 504, the processor 202 may initiate a data formatting operation on the discovered data received from the one or more smart devices in step 502. In one embodiment, the discovered data, in raw format, may be formatted to a particular data structure, by the processor 202, executing readable code comprising a set of procedures for creating the data structure. In one embodiment, the data structure is an array. In another embodiment, the data structure is a list. In yet another embodiment, the data structure is a combination of one or more data types as needed for the processor 202 to perform a data analysis operation. When the data formatting operation is complete, the data structures are temporarily stored in the memory 204 by the processor 302.

At step 506, the processor 202 performs a comparison operation comprising, inspecting, filtering, sorting, transforming, clustering, correlating, etc., of some or all of the discovered data to determine one or more apps that is not present in one smart device but present in one or more other smart devices at the end user's home. When the data comparison operation is complete, the data results are temporarily stored in the memory 204 by the processor 202 and the processor 202 initiates a determination operation.

In another embodiment, the processor 202 compares at least some of the entirety of the discovered data to one or more desired apps from an MSO, OEM, or other party, to determine apps that are not installed on one or more smart devices in the end user's home. In this embodiment, the processor 202 receives an indication of one or more desired apps from one or more parties, such as OEMs, an MSO, etc. and stores the indication in the memory 202 for later comparison to discovered data received from end users' smart devices.

In yet another embodiment, the processor 202 receives an indication of a current version number of one or more apps, and compares the current version numbers to actual version numbers of installed apps at the end user's home, as provided in the entirety of the discovered data.

At step 508, in one embodiment, the processor 202 sends a message to the processor 302 comprising a notification of one or more apps that are present in at least one smart device, but not present in other smart devices (herein "missing apps"). In another embodiment, the message comprises a notification of one or more apps present on one device type (such as a set-top box, television, tablet computer, mobile phone, etc.) but missing from other similar device types. In another embodiment, the message from server 128 comprises an identification that a new version of one or more apps on one or more smart devices is available.

At step 510, in one embodiment, the server 128, via the processor 202 and the communication interface 206, sends a message to the end user comprising a notification of one or more apps that are present in at least one smart device, but not present in another smart device. In another embodiment, the message is provided to an OEM, MSO or other party for that party to transmit a message to the user of one or more missing apps from one or more smart devices at the end user's home. In either case, the notification may comprise an invitation for the end user to install the apps listed in the message. The message may, alternatively or in addition, be displayed to other smart devices on the same local-area network as the smart device that received the message from the server 128, OEM, MSO or other third party.

In another embodiment, the processor 302 generates customized notifications for one or more other smart devices, each customized notification comprising a listing of missing apps particular to each smart device that lacks at least one app. In one embodiment, the message may comprise an activable icon or text for display via the user interface 308, for user activation.

In yet another embodiment, the server 128, OEM, MSO or other party may automatically provision a smart device associated with such a party with the missing apps and may automatically perform an app installation operation with or without a notification to the user.

At step 512, in one embodiment, the processor 202 receives a request from one or more smart devices located at the end user's home for the server 128 to provide one or more apps identified in the request. The apps identified in the request are a result of the end user choosing to have one or more missing apps installed on one or more smart devices.

At step 514, the processor 202 retries the apps identified in the request in step 512 from the memory 204 and provides the identified apps to one or more smart devices at the end user's home via the communication interface 206 and the wide-area network 132.

Figure 6:
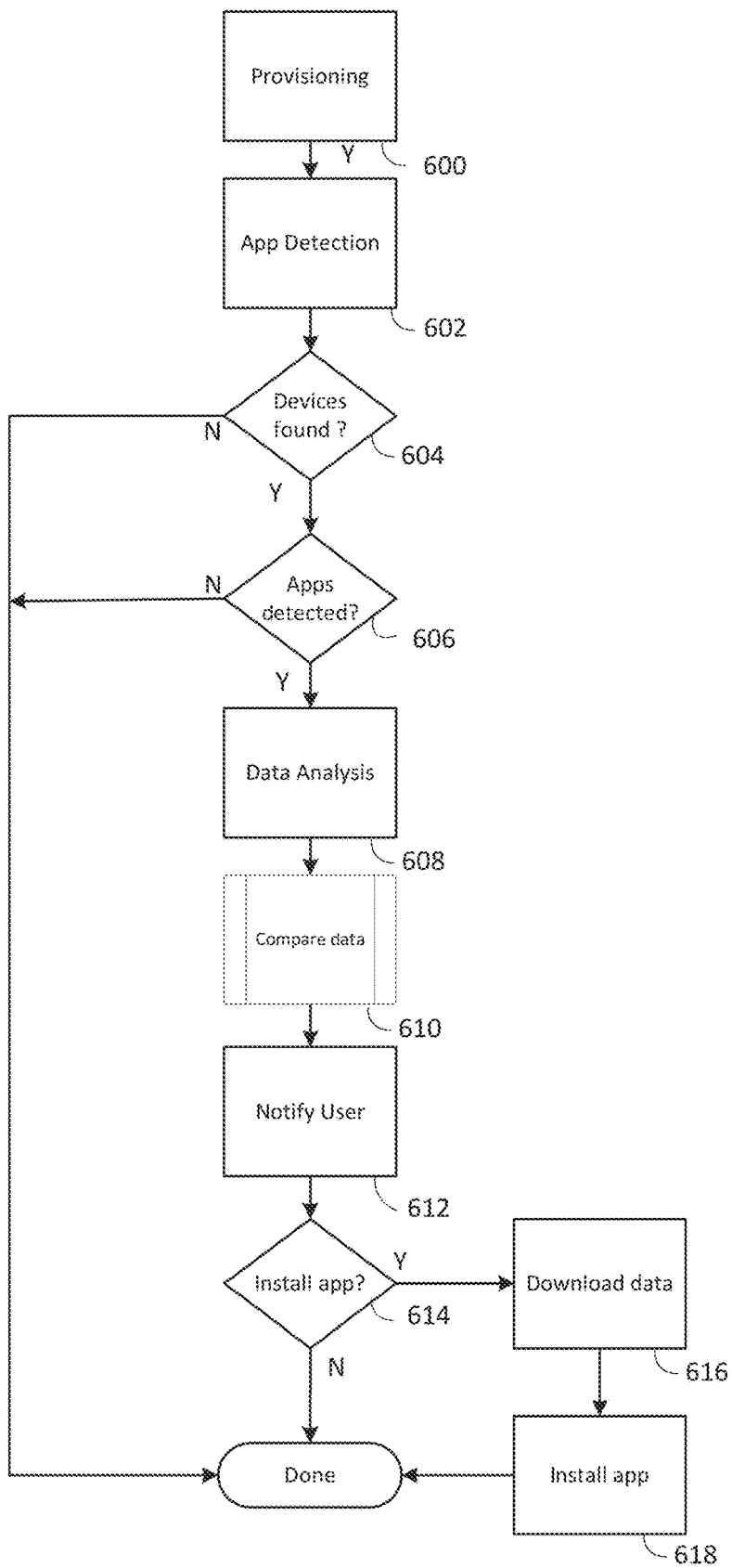
FIG. 6 is a flow diagram illustrating one embodiment for promoting apps as performed by the smart device shown in FIGS. 1 and 2.

FIG. 6 is a flow diagram illustrating one embodiment of a method for promoting apps to an end user of a smart device, performed by a smart device in a cooperative operation with the server 128. The method is implemented by a processor, such as the processor 302 shown in FIG. 3, located within the smart device, executing processor-executable instructions stored in the memory 304 as shown in FIG. 3. It should be understood that in some embodiments, not all of the steps shown in FIG. 6 are performed and that the order in which the steps are carried out may be different in other embodiments. It should be further understood that some minor method steps, which would be recognized by those of ordinary skill in the art, have been omitted for purposes of clarity.

At step 600, a user of the smart device may initiate a provisioning operation, for example when a user of a smart device initially powers on a smart device, via a key press on the controlling device 102 or via a voice command recognized and acted on by the controlling device 102. For example, the smart device may be adapted to receive commands from the controlling device 102, which may comprise a conventional universal remote control or a remote control type app resident on a smart device, such as a phone or tablet, etc., using any convenient protocol and command structure (IR, RF4CE, BLE, proprietary RF, etc.). Initiating a provisioning operation comprises the processor 302 executing the processor-executable code that causes the smart device to initiate a connected device detection operation. The connected device detection operation detects the presence of other smart devices and/or smart appliances located at an end customer location, i.e., at a location where the smart device is located and/or on a same local area network as the smart device. The operation may be performed automatically, such as at predetermined times or upon the occurrence of one or more predetermined events, or it may be initiated manually, such as by a user causing the remote control 102 to send a wireless signal to the smart device to perform the operation. The operation comprises the processor 302 sending commands, via the communication interface 306 and the local-area network 132, to any other detected smart devices, for the other smart devices to provide each smart device's device information, such as described at step 402, to the requesting smart device and the information is typically stored by the processor 302 in the memory 304.

At step 602, the processor 302 performs an app detection operation, either automatically at one or more predetermined times or upon the occurrence of one or more events (for example, upon receiving the discovered connected device information in step 602), or manually, for example in response to receiving a command from the remote control 102. In one embodiment, the app detection operation is automatically triggered with device detection operation in step 602. The app detection operation identifies apps presently installed on other smart devices that were detected in step 602. Each smart device having an app installed therein provides information related to the installed app, such as app developer identification, a hardware platform identification, (i.e. a Roku brand media player, Apple TV brand media player, Amazon Fire brand media player, etc.), an app name, an app version, an app category, an app objective (e.g., to share photos, discover new music, etc.), a target audience (e.g., avid readers, awesome parents, etc.), a user profile which may include app authentication data, etc. The discovered app information may comprise one or more parameters or characteristics which may differ from app to app and from device to device. For example, the TV 106 may determine that STB 110 contains installed apps such as an ABC network brand app, a Discovery Channel brand app, a Hulu brand app, a Pandora brand app, a DirecTV brand user profile and viewing history, etc., and determine that TV 106 contains a Hulu brand and a Pandora brand app. The user profile comprises the user's on-line service account information associated with a particular media service, in this case DirecTV brand service provider, account log-in information, authentication data and end user identity information. The user identity information may include but is not limited to, on-line account data and/or account log-in authentication, associated cloud based authentication data, name, location address, IP address, digital identity, login information, gender, telephone number, preferences, web cookies, personal data located in a smart device, etc., which may reside in a multitude of locations.

At step 604, when the device detection operation identifies no new devices, the operation is complete and the smart device resumes normal operations. When a new device is detected, the app detection operation discussed above may be automatically initiated by the processor 302 for the purpose of detecting installed apps on each of the discovered devices.

At step 606, when no new apps are discovered from the app detection operation in step 602, the method ends, and the smart device resumes normal operations. If one or more apps are discovered, processor 302 stores the information related to the discovered apps in the memory 304, in one embodiment, in association with each smart device that each app is installed.

At step 608, the processor 302 may initiate a data formatting operation and/or perform a data analysis operation of some or all of the discovered data. In one embodiment, some or all of the discovered data, in raw format, may be formatted to a particular data structure by the processor 302. In one embodiment, the data structure is an array. In another embodiment, the data structure is a list. In yet another embodiment, the data structure is a combination of one or more data types as needed for the processor 302 to perform a data analysis operation. When the data formatting operation is complete, the data structures are temporarily stored in the memory 304 by the processor 302 and the processor 302 may initiate a data analysis operation.

The data analysis operation may be automatically initiated, by the processor 302, at one or more predetermined time intervals, or when the data formatting is complete. In one embodiment, the data analysis may be performed via a cooperative operation of one or more smart devices, comprising the processor 302, via the communication interface 306, communicatively coupled to each other. In another embodiment, the data analysis operation comprising a data structure comparison operation and a determination of a media content, such as an app, which is not present in the smart device 106 and which is present in one or more of the communicatively coupled smart devices or smart appliances. In yet another embodiment, the raw data, as received from the processor 302, is analyzed similarly by the processor 302.

At step 610, the processor 302 performs a comparison operation comprising, inspecting, filtering, sorting, transforming, clustering, correlating, etc., of some or all of the discovered data to determine one or more apps that are not present in one smart device 106 but is present in one or more of the communicatively coupled smart devices or smart appliances. When the data comparison operation is complete, the data results are temporarily stored in the memory 304 by the processor 302.

In another embodiment, the processor 302 receives a notification from the server 128, via the wide-area network and the communication interface 306, indicating one or more desired apps that an MSO, OEM or other party would like to have installed into one or more smart devices. In this embodiment, the processor 302 compares the indication of desired apps to the discovered app information to determine apps that have not been previously installed onto one or more smart devices in the common local-area network 132.

In yet another embodiment, the processor 202 receives an indication of a current version number of one or more apps from the server 128, and compares the current version numbers to actual version numbers of the installed apps on one or more of the smart devices in the common local-area network 132.

At step 612, in one embodiment, the processor 302 causes a notification to be presented to a user of the smart device associated with the processor 302 via the user interface 308, querying a user of the smart device whether the user would like to install the apps identified in step 610. The notification may, alternatively or in addition, be displayed to other smart devices on the same local-area network as the smart device that identified the missing apps. In this embodiment, the server 128 evaluates a user profile stored in the memory 204 to determine one or more smart devices that are commonly owned by the end user associated with the user profile. Such information may have been pre-stored as part of a provisioning process, such as when a user first creates an account with an MSO or other service provider.

In one embodiment, the processor 302 generates customized notifications for one or more other smart devices, each customized notification comprising a listing of the missing apps that are relevant to each smart device type, make and/or model, as identified in step 610. For example, if the smart device comprising the processor 302 is a television, and another smart device on the same local-area network is an Apple iPad brand device, and the message comprises an identification of a Hulu brand app for an Apple iPad brand device and a Netflix brand app for any make of television, the processor 302 may generate and cause a notification to be displayed on user interface 308, querying a user whether or not to install the Netflix brand app, and also generate and send a second notification to the iPad brand device, querying a user whether or not to install the Hulu brand app.

In one embodiment, the notification may comprise an activable icon or text for display via the user interface 308, for user activation. Such instructions to a user may be indicated via use of an icon, which may be displayed as activable text, such as "Watch Now," "Install," or "Play" which, when activated by the user, cause the app and/or media content to be installed and/or downloaded.

In one embodiment, the processor 302 may generate an icon, text message, voice message, email, or some other notification, for transmission to a mobile device associated with the user. The processor 302 may obtain contact information of the user by providing an inquiry to the server 128, where the user's phone number or email address may be stored in association with a user account, and transmit the text message, voice message, email, or other notification directly to the user.

In another embodiment, the processor 302 sends a command to the server 128 for the server 128 to generate such a text message, voice message, email or other notification and provide such a message to the user, using contact information stored in the database 130.

In yet another embodiment, the apps listed in the message from the server 128 and associated with the type, make and/or model of the smart device are automatically installed on each of the smart devices, without notifying the user.

At step 614, a user responds to the notification generated by the processor 302 using the user interface 308, which provides a user response to the processor 302 of whether the user wants to install, store, activate, download, or otherwise accept the app(s) displayed by the user interface 308. The response may comprise an identification of the apps selected by the user, in the case where two or more missing apps are missing from the smart device.

At step 616, in response to receiving the user response in step 614, in one embodiment, the processor 302 generates and transmits a command, via the communication interface 306, to obtain the identified app(s) which are downloaded from a cloud server over the wide-area network 132. The identified app(s) are received by the processor 302 over the wide-area network 132 and the communication interface 306 where they are stored in the memory 304.

At step 618, the processor 302 installs the received app(s) from step 614, and after installation, the processor 302 may generate and display a message to the user that the app(s) have been successfully installed.

It is to be understood that, while illustrated in the context of UCE 100, being embedded within a smart device or a smart appliance, UCE 100, may be coupled to a stand-alone apparatus having instructions, stored on a non-transient, computer readable media accessible by the processing controller of the stand-alone apparatus. Additionally, the stand-alone apparatus is coupled to one or more transmitters, for wireless communication using one or more RF communication protocols, and may comprise one or more HDMI ports which may interact with detected smart devices or smart appliances. Alternatively, the stand-alone apparatus may be adapted to communicate with a multitude of smart devices or smart appliances each communicating in a different wired or wireless protocols.

For example, the stand-alone apparatus may be adapted as an intermediary adapter, such as a dongle provisioned with a non-transient, computer readable media or with firmware, comprising a Wi-Fi transmitter, an RF4CE transmitter and a Bluetooth transmitter, each coupled to processor which is coupled a processor for communicating with a touch panel. When the user activates the touch panel coupled to the smart refrigerator 126, which was provisioned at an earlier time to communicate with the intermediary adapter, activates a command to control a smart audio receiver to play music and simultaneously activates a wireless signal to dim the lights, via sending a command to a smart hub such as Samsung's Smart Hub, causing a first communication to be received by the adapter via a Wi-Fi protocol. The intermediate adapter may automatically select the optimum communication protocol for each function of each configured smart appliance which may be sent to each target smart appliance as a second protocol which is different than the first protocol of the first received communication. For example, as described in U.S. Pat. No. 9,215,394 which is incorporated herein by reference in its entirety.

It is to be understood that a smart appliance, comprising UCE 100, which performed the provisioning and app discovery operation may be adapted for executing processor-executable instructions stored in memory 204 as shown in FIG. 2 to periodically monitor other smart devices to determine a change in their state and store that information locally, in the database 130, via the server 128, and/or in a cloud server provisioned by an MSO or OEM.

As further discussed above, it is also contemplated that a smart appliance, comprising UCE 100, may be coupled to a cloud service, which may be adapted for use as a communication bridge for transmitting discovered connected device information, between connected smart devices, smart appliances or a combination of both. For example, when a smart device is provisioned, using an automatic process or provisioned via use of a wizard based interactive process, smart device or smart appliance identity data, the user's profile data and the installed app data, associated with one or more smart devices or smart appliances, may be received by the TV 106 associated with a cloud service. The associated cloud service may receive the data instantaneously upon completion of the provisioning process or may receive partial data at different time intervals such as when a newly connected smart appliance is detected or removed from the system configuration.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer-readable media having stored thereon instructions which, when executed by a smart device, cause the smart device to perform steps comprising:
   receiving, via the communication interface of the smart device, installed app information of a one or more other smart devices on a common local-area network as the smart device;
   causing the received installed app information of each of the one or more other smart devices that provided installed app information to the smart device to be compared with an identification of promoted apps to determine a one or more missing apps, the one or more missing apps comprising a one or more apps listed in the identification of promoted apps that are not determined to be present in the one or more other smart devices; and
   causing a notification to be provided to the one or more other smart devices indicating that the one or more of the missing apps are available for installation on the one or more other smart devices.

2. The non-transitory, computer-readable media as recited in claim 1, wherein the installed app information of the one or more other smart devices are caused to be received at predetermined times.

3. The non-transitory, computer-readable media as recited in claim 1, wherein the installed app information of the one or more other smart devices are caused to received in response to a predetermined event.

4. The non-transitory, computer-readable media as recited in claim 3, wherein the predetermined event comprises a powering on of the smart device.

5. The non-transitory, computer-readable media as recited in claim 3, wherein the predetermined event comprises a coupling of the smart device to the local-area network.

6. The non-transitory, computer-readable media as recited in claim 1, wherein the smart device receives from a remote server the identification of promoted apps and the instructions cause the smart device to determine the one or more missing apps.

7. A non-transitory, computer-readable media having stored thereon instructions which, when executed by a smart device, cause the smart device to perform steps comprising:

receiving, via the communication interface of the smart device, installed app information of a one or more other smart devices on a common local-area network as the smart device;

causing the received installed app information of each of the one or more other smart devices that provided installed app information to the smart device to be compared with an identification of promoted apps to determine a one or more missing apps, the one or more missing apps comprising a one or more apps listed in the identification of promoted apps that are not determined to be present in the one or more other smart devices; and causing the one or more missing apps to be automatically installed on the one or more other smart devices.

8. The non-transitory, computer-readable media as recited in claim 7, wherein the installed app information of the one or more other smart devices are caused to be received at predetermined times.

9. The non-transitory, computer-readable media as recited in claim 7, wherein the installed app information of the one or more other smart devices are caused to received in response to a predetermined event.

10. The non-transitory, computer-readable media as recited in claim 9, wherein the predetermined event comprises a powering on of the smart device.

11. The non-transitory, computer-readable media as recited in claim 9, wherein the predetermined event comprises a coupling of the smart device to the local-area network.

12. The non-transitory, computer-readable media as recited in claim 7, wherein the smart device receives from a remote server the identification of promoted apps and the instructions cause the smart device to determine the one or more missing apps.

* * * * *